United States Patent [19]

Sugita et al.

[11] Patent Number: 4,458,154

[45] Date of Patent: Jul. 3, 1984

[54] APPARATUS FOR ACCUMULATION AND STORING LIGHT ENERGY AND RELEASING THE SAME THEREFROM FOR UTILIZATION

[76] Inventors: Toshio Sugita, 17-12, Takamatsu-cho 2-chrome, Tachikawa-shi, Tokyo; Masahide Kamiyama, 24, Naka-cho, Shinjuku-ku, Tokyo, both of Japan

[21] Appl. No.: 488,715

[22] Filed: Apr. 26, 1983

Related U.S. Application Data

[62] Division of Ser. No. 188,868, Sep. 19, 1980.

[30] Foreign Application Priority Data

Sep. 21, 1979 [JP] Japan ............................... 54-120836

[51] Int. Cl.³ ......................... G01J 1/58; G01N 21/64

[52] U.S. Cl. ............................... 250/484.1; 250/485.1

[58] Field of Search ............ 250/337, 370, 371, 484.1, 250/336, 485.1

[56] References Cited

U.S. PATENT DOCUMENTS

| | | | |
|---|---|---|---|
| 3,145,568 | 8/1964 | Yellott | 250/370 |
| 3,569,702 | 3/1971 | Schayes | 250/337 |
| 3,789,227 | 1/1974 | Eichner et al. | 250/337 |
| 4,016,422 | 4/1977 | Moran et al. | 250/337 |
| 4,303,861 | 12/1981 | Ekstrom | 250/370 |

*Primary Examiner*—Janice A. Howell

*Attorney, Agent, or Firm*—Birch, Stewart, Kolasch and Birch

[57] ABSTRACT

A light absorbing matter is irradiated by light ranging from ultraviolet to infrared and absorbed light energy causes the matter to be raised to an excited energy state. The excited state is then locked by maintaining the temperature of the matter at a predetermined value. Light energy thus stored can be released for utilization by changing the value of the temperature from the predetermined value.

7 Claims, 3 Drawing Figures

APPARATUS FOR ACCUMULATION AND STORING LIGHT ENERGY AND RELEASING THE SAME THEREFROM FOR UTILIZATION

This application is a divisional of copending application Ser. No. 188,868, filed on Sept. 19, 1980.

BACKGROUND OF THE INVENTION

This invention relates to a method permitting wide range utilization of light energy, including a series of processes consisting of accumulating and storing light energy in a medium and releasing the same therefrom at a desired instant.

When certain materials are irradiated by light, eigenstates of atoms constituting these materials are excited by absorbing light energy and transitions take place from a low energy state ($E_o$) to high energy states (ex. $E_1$) (cf. FIG. 1). To the contrary, when atoms are in excited states ($E_1$, $E_2$, $E_3$, . . . ), interactions with other atoms cause transitions from the excited states to more stable energy states and energy differences between them ($\Delta E_1$, $\Delta E_2$, $\Delta E_3$, . . . ) are emitted in the form of light having various frequencies ($\nu_1$, $\nu_2$, $\nu_3$, . . . ). This relationship can be expressed as follows;

$$\Delta E_1 = h\nu_1, \Delta E_2 = h\nu_2, \Delta E_3 = h\nu_3, \ldots$$

Now, if it were possible to lock the aforementioned excited states as they are (i.e. to forbid the transitions from the high energy states $E_1$, $E_2$, $E_3$ . . . to the more stable ones in order to lock the excited states) and in addition to release the aforementioned excitation energy (i.e. to allow the transitions) at a desired instant, it would be feasible to accumulate and store light energy in a medium and to release it therefrom when needed for its utilization.

The inventors have found according to the results of their investigation that if states formed by addition, absorption, and the like to different kinds of atoms and molecules are utilized as storing medium besides eigenstates of light absorbing matter, it is possible to accumulate and store light energy in the storing medium and release it therefrom at a desired instant as mentioned above by controlling temperature of the light absorbing medium.

In the case where light energy is released in the form of light at a desired instant, it is possible to obtain regenerated light having a predetermined wavelength region by choosing the kind of atoms or molecules to be added to the light absorbing matter.

By choosing a light absorbing matter which emits visible light, regenerated light can be used or illuminated. By means of a suitable photo-electric converter regenerated light can be used also for electric energy production. Moreover, by using light absorbing matter having a large area, it is possible to accumulate and store light energy and to release it therefrom at a desired instant for a long period of time and in a continuous manner.

Thus this invention permits the accumulation of light energy in a light absorbing matter owing to excitation of matters to high energy states, and to lock the higher energy states in order to store absorbed light energy during a desired period of time. The invention is characterized in that light energy thus stored is released by trigger means such as heat at a desired instant. In this way this invention allows wide range utilizations of solar light and other light energies by means of such technical contributions.

The object of this invention is, therefore, to provide a series of processes permitting the accumulation of light energy by irradiating a light absorbing matter, to store the energy therein and to release light energy thus stored at a desired instant.

DETAILED DESCRIPTION

Figure 1:
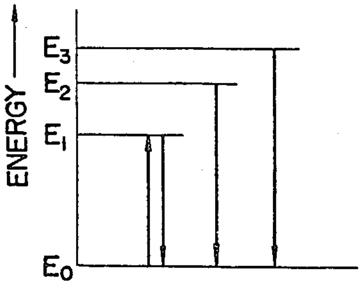
FIG. 1 is an energy level diagram explaining the fundamental conception of the invention.

The invention will be explained by using some preferred embodiments.

According to the invention, as light absorbing matter, phosphors which can be one of carbonates, sulphates, silicates, sulfides, oxides and halides of one of the elements indicated in Column A of Table 1, can be used. Column B of Table 1 shows respective examples of aforementioned carbonates, sulphates, etc.

TABLE 1

| A | | B | | |
|---|---|---|---|---|
| Calcium | (Ca) | Carbonates | $CaCO_3$ | $MgCO_3$ |
| Beryllium | (Be) | | $SrCO_3$ | $BaCO_3$ |
| Magnesium | (Mg) | | $CaMg(CO_3)_2$ | $Pb_2Cl_2CO_3$ |
| Strontium | (Sr) | Sulphates | $CaSO_4$ | $SrSO_4$ |
| Barium | (Ba) | | $BaSO_4$ | $Na_2SO_4$ |
| Lithium | (Li) | Silicates | $CaSiO_3$ | $LiAlSiO_3$ |
| Sodium | (Na) | | $Zn_2SiO_4$ | $Al_2SiO_4$ |
| Zinc | (Zn) | Sulfides | CaS | ZnS |
| Aluminum | (Al) | Oxides | $Al_2O_3$ | $BeAl_2Si_4O_{18}$ |
| Lead | (Pb) | Halides | $CaF_2$ | $LiF_2$ |

Light absorbing matter can be one of the phosphors indicated in Table 1, to which a small amount of one of the elements indicated in Column A of Table 2 is added as an activator. Column B of Table 2 shows some examples of these activated phosphors.

TABLE 2

| A | | B | |
|---|---|---|---|
| Strontium | (Sr) | $CaCO_3$; | Sr |
| Magnesium | (Mg) | $CaCO_3$; | Mg |
| Tin | (Sn) | $CaCO_3$; | Sn |
| Bismuth | (Bi) | $CaCO_3$; | Bi, CaS; Bi |
| Boron | (B) | CaS; | B + Cu |
| Manganese | (Mn) | $CaCO_3$; | Mn, $CaSO_4$; Mn |
| Lead | (Pb) | $CaCO_3$; | Mn + Pb, NaCl; Mn + Pb |
| Chromium | (Cr) | $Al_2O_3$; | Cr, $Be_3Al_2Si_4O_{18}$; Cr |
| Cupper | (Cu) | ZnS; | Cu |
| Lanthanum | (La) | $CaCO_3$; | La |

TABLE 2-continued

| A | | B | |
|---|---|---|---|
| Neodymium | (Nd) | $CaCO_3$; | Nd |
| Europium | (Eu) | $CaF_2$; | Eu |
| Samarium | (Sm) | $CaCO_3$; | Sm |
| Thulium | (Tm) | $CaSO_4$; | Tm |
| Yitrium | (Y) | $CaF_2$; | Y |
| Terbium | (Tb) | $MgSiO_4$; | Tb |

EXEMPLARY EMBODIMENT OF THE INVENTION 1

Embodiment 1 shows an example of a series of processes consisting of accumulating and storing visible light and its regeneration at a desired instant by temperature control, i.e. thermal operation.

Sulfides and silicates of Zn were prepared, to which a small amount of one of the metal elements Cu, Mn, B, Bi, etc. was added. Thin films and fine particles made of these materials accumulate and store light energy in a wavelength region from 1800 to 7000 Å, which they receive at a temperature under −50° C. At a desired instant after irradiation by light energy, the light energy thus stored could be regenerated in the form of visible light by raising the temperature of the thin films and fine particles of the aforementioned materials to a temperature which was equal to or higher than room temperature. Wavelength of this regenerated light was measured and it was found to be 5260 Å.

Results obtained with calcium sulfide, to which a small amount of one of the aforementioned elements was added, were similar to those previously described. Light energy was accumulated and stored at −50° C.; light used for irradiation was solar light; light was regenerated by raising the temperature to room temperature; and the wavelength of the regenerated light was 4800 Å.

Results of experiments similar to those described above are summarized in Table 3, in which Column A indicates phosphors used; Column B the condition for storing and regeneration of light energy; Column C the wavelength region of the regenerated light; and Column D the wavelength at the peak of the regenerated light spectrum.

TABLE 3

| A | B | Emission spectra | |
|---|---|---|---|
| Phosphors | temp (°C.) | C range | D max. peak |
| $Zn_2SiO_4$ | −50 → R.T. | 4800 ~ 7000 (Å) | 5200 (Å) |
| ZnS'; Cu | −50 → R.T. | 4400 ~ 6800 | 5300 |
| $CaSO_4$; Mn | R.T. → 110 | 4500 ~ 6000 | 5000 |
| $CaSO_4$; Tm | R.T. → 220 | | 4520 |
| $Mg_2SI_4$; Tb | R.T. → 200 | | 5500 |
| $CaF_2$ | R.T. → 260 | 3500 ~ 5000 | 3800 |

EXEMPLARY EMBODIMENT OF THE INVENTION 2

Figure 2:
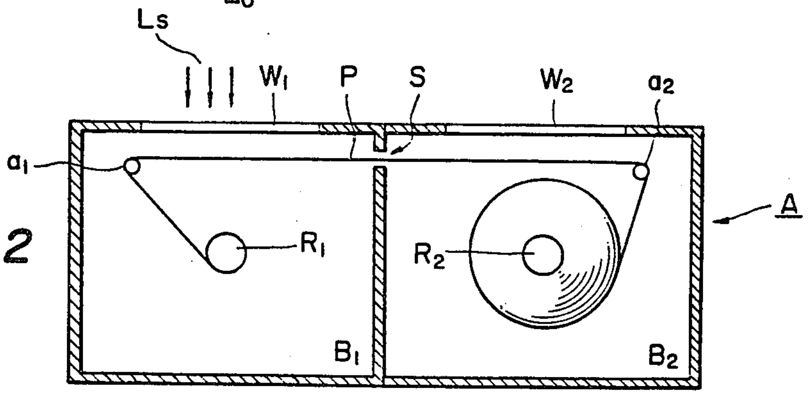
FIGS. 2 and 3 are explanatory schemes of an example for the utilization of light energy according to this invention.
Figure 3:
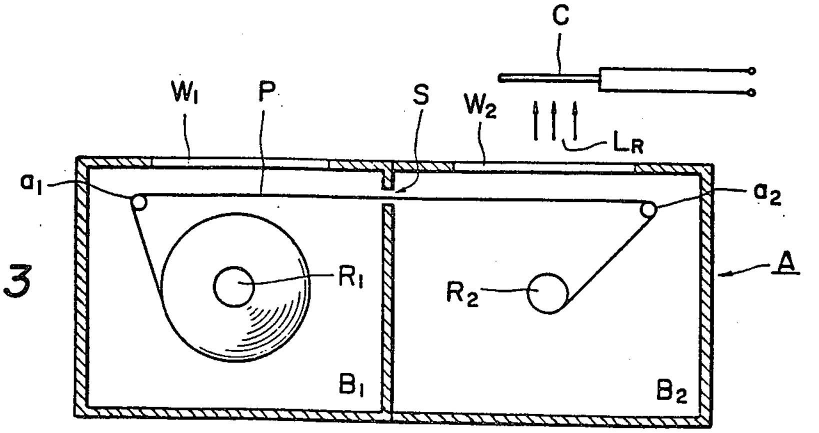

Embodiment 2 is an example of applications of this invention, for which light absorbing matter, which is sulfide or silicate previously mentioned, is applied on a tape made of paper and solar light energy is stored and regenerated after a storage of a long period, using an apparatus and process indicated in FIGS. 2 and 3.

The indicated apparatus A consists of the first and second chambers, $B_1$ and $B_2$ respectively, which are isolated from each other by an isolating wall. Each of the chambers has a window, $W_1$ and $W_2$ respectively, through which solar light $L_s$ enters in the chambers. $R_1$ and $R_2$ represent rotary roller shafts disposed respectively in the chambers $B_1$ and $B_2$. The extremities of a long tape P are fixed respectively to the shafts. This tape P passes from one of the shaft (ex. $R_1$) around studs $a_1$ and $a_2$ and in front of the windows $W_1$ and $W_2$ to the other (ex. $R_2$). The tape P traverses the insulating wall between the chambers through a slit S so that the conditions in the different chambers don't influence each other.

For instance, the first chamber $B_1$ of the above described apparatus A is set at a temperature, which is equal to or lower than −50° C., while the second one $B_2$ is set at a temperature, which is equal to or higher than room temperature. At first, the tape P is wound on the shaft $R_2$ in the second chamber $B_2$ (FIG. 2).

Starting from this state, the tape P is wound on the shaft $R_1$ in the first chamber $B_1$ while being irradiated by solar light through the window $W_1$ of the first chamber $B_1$. Light absorbing matter applied on the tape P exposed to solar light $L_s$ absorbs and stores energy. Solar light energy remains absorbed in the light absorbing matter so long as the tape P is maintained at a temperature under −50° C. in the first chamber $B_1$ (as indicated in FIG. 3).

After that at a desired instant the tape P was displaced into the second chamber $B_2$. Solar light energy stored in the first chamber was released in the form of visible light in the second chamber, thereby the temperature condition mentioned above acting as trigger. The regenerated light was observed through the window $W_2$. In the case where the tape described for Embodiment 1 is used as light absorbing matter, the wavelength of the continuously regenerated light $L_R$ is 5260 Å.

Further a photo-electric converter C was placed in front of the window $W_2$ through which light energy is released and irradiated by the regenerated light $L_R$. In this way, it was confirmed that an electric current, which was equal to or greater than $10^{-9}$ Å for a tape speed of 1 $cm^2$/min, was produced.

As explained above, according to this invention, it is possible to accumulate and store light energy by exciting a light absorbing matter to excited energy states, to maintain the light absorbing matter at the excited energy states by controlling temperature and to regenerate it at a desired instant. This invention permit the control of operations from accumulating and storing light energy to releasing it for utilization, and can thus contribute to wide range utilizations of light energy.

What we claim is:

1. An apparatus for accumulating and storing light energy and releasing the same therefrom, comprising in combination:

a first chamber and a second chamber separated from each other by an isolation wall, each of said chambers having first and second windows, respectively, through which light ranging in wavelength from ultraviolet to infrared passes into or out of said respective chambers;

first and second rotary shafts disposed respectively in said first and second chambers;

a light adsorbing means, the extremities of which are fixed to each of said first and second shafts respectively, such that said means passes from one of said chambers to the other of said chambers in front of said respective windows, said first chamber being set at a predetermined temperature which is lower than the temperature of said second chamber.

2. The apparatus of claim 1, wherein said light absorbing means comprises a light absorbing medium.

3. The apparatus of claim 2, wherein said light absorbing medium is a phosphor selected from at least one member of the group consisting of $CaCO_3$, $MgCO_3$, $CaMg(CO_3)_2$, $SrCO_3$, $BaCO_3$, $Pb_2Cl_2CO_3$, $CaSO_4$, $SrSO_4$, $BaSO_4$, $Na_2SO_4$, $CaSiO_3$, $LiAlSiO_3$, $Zn_2SiO_4$, $Al_2SiO_4$, CaS, ZnS, $Al_2O_3$, $BeAl_2Si_4O_{18}$, $CaF_2$ and $LiF_2$.

4. The apparatus of claim 2, wherein said light absorbing medium is a phosphor containing a small amount of at least one element selected from the group consisting of Sr, Mg, Sn, Bi, B, Mn, Pb, Cr, Cu, La, Nd, Eu, Sm, Tm, Y and Tb as activator.

5. The apparatus of claim 1, wherein said temperature of said first chamber is equal to or less than −50° C. and said temperature of said second chamber is equal to or higher than room temperature.

6. The apparatus of claim 1, wherein said isolation wall includes an opening through which said light absorbing means passes.

7. The apparatus of claim 1, wherein said isolation wall is an insulating wall.

* * * * *